Patented May 13, 1947

2,420,475

UNITED STATES PATENT OFFICE 2,420,475

FRICTION COMPOSITION AND METHOD OF PREPARING THE SAME

Herbert H. Greger and Southwick W. Briggs, Washington, D. C.

No Drawing. Application January 10, 1942, Serial No. 426,358

2 Claims. (Cl. 106—36)

This invention relates to friction materials adapted for use as brake blocks or brake and clutch linings and more particularly to friction compositions of the foregoing type prepared with inorganic binders comprising phosphatic or arsenious materials.

Heretofore, friction materials employed in the manufacture of brake blocks or brake and clutch linings have comprised woven or felted asbestos and binders therefor such as linseed oil, Chinawood oil or thermosetting synthetic resins. These compositions ordinarily contain about 50 percent asbestos, about 15 percent binder such as a phenolformaldehyde resin and a number of modifying ingredients designed to control the frictional and other characteristics of the product. These ingredients may be mixed together in either a dry or semi-plastic condition and the mass thus obtained is formed by molding or extrusion. The molded product is solidified by the action of heat which sets the binders. While many friction materials of this type have been employed with success, they have been objectionable because of the effect of heat upon the binder. When these friction materials are employed in heavy duty work in which large amounts of heat are generated, synthetic resin or oxidizable and polymerizable oil binders will char and the friction material will fail as a result thereof. In contrast, the friction materials of this invention demonstrate remarkable heat stability and the binding agents employed therein upon continued heating are merely dehydrated with the result that the hardness thereof increases.

The principal object of this invention is to provide a friction material in which the binding agent is an inorganic thermosetting composition.

Another object of this invention is to provide an inorganic thermosetting binder which may be employed in previously known methods of bonding friction compositions with thermosetting materials.

A further object of this invention is to provide a bonded friction material possessing high heat stability which will retain its frictional properties when subjected to large quantities of heat.

Still another object of this invention is to provide a friction material in which the binding agent is an inorganic composition capable of being rapidly solidified by either chemical hardening or by drying.

A still further object of this invention is to provide a friction composition in which the binding agent is an inorganic composition containing a phosphatic or arsenious material and a different inorganic or organic acid radical capable of being rendered inactive either by chemical hardening or by drying operations adapted to solidify the binder.

It is also an object of this invention to provide a friction composition in which the bonding agent is an inorganic composition containing a hydrated salt capable of dissolving in its water of crystallization and reacting with other components of the binder to form a water resistant, insoluble bond.

This invention is primarily directed to friction compositions comprising bonded, heat resistant materials such for example, as asbestos and water ground delaminated mica. The binding agents employed therein may be formed from compositions containing phosphates or arsenates of trivalent metals such as aluminum, iron and nickel. Under suitable conditions of water content, composition and mode of production, these compounds form viscous, tacky solutions which may be incorporated with asbestos or other heat resistant materials. Such mixtures may be formed into desired shapes and the viscous, tacky binder thereafter transformed into a solid either by chemical reaction or by drying. The viscous tacky characteristic of the binders is important since it imparts good wet strength to the molded article and facilitates handling. The binders may also be solid compositions comprising trivalent metal phosphates which dissolve in water to form viscous tacky binders similar to those mentioned above. This invention further contemplates friction materials prepared by mixing the heat resistant material with a mixture of dry ingredients capable of forming a binder and thereafter steaming the mixture to promote the binder forming reaction.

A principal feature of each of the foregoing types of binders mentioned resides in the introduction into the system of other acid radicals such as the sulphate, chloride or nitrate radicals either as an acid or as a salt of the metals in the binder. Organic acids may be used with equivalent results in certain instances though their use is especially adapted for certain specific applications. These acid radicals perform certain definite functions in the binder system and having performed that function may be rendered inactive during the chemical hardening process or the drying operation to provide a metallic phosphate or arsenate bond between the particles of asbestos or other heat resistant material.

This invention is further directed to friction compositions in which the heat resistant components are bonded with an inorganic binder formed from the reaction of an insolubilizing compound and the reaction product of a hydrated salt dissolved in its own water of crystallization and a compound containing the phosphate radical. In preparing friction compositions of this type it is contemplated that asbestos or other heat resistant materials be mixed with the hydrated salt, insolubilizing compound and other binder reactants. The resultant mixture may then be formed by molding with heat and pressure. During this process the water of crystallization of the hydrated salt is released whereupon the salt dissolves and reacts with other components. The mass is then allowed to cool and transform the reaction product into a solid, water resistant and insoluble binder.

The friction compositions described above generally and their mode of preparation may be classified according to the type of binding agent employed in their preparation and will now be considered from that aspect.

TYPE I

The friction compositions falling within this class are prepared with binding agents which are relatively neutral in character. The binding agents herein comprise aqueous solutions of trivalent metal phosphates and trivalent metal salts of sulfuric, hydrochloric, nitric or other inorganic or organic acids. Trivalent metal phosphates as for example aluminum phosphate may be dissolved in an aqueous medium along with aluminum salts of acids such as sulfuric, hydrochloric or nitric acids. The latter salts increase the solubility of aluminum phosphate.

As stated above, the phosphate of a trivalent metal may be dissolved in the presence of a soluble organic acid salt of a trivalent metal. The use of organic acid salts is limited owing to their cost and the fact that they are somewhat less effective in their action. Their principal application is in connection with binders which consist in part of organic solvents.

The setting or transformation of these compositions into a solid state may be performed by drying to dehydrate the compositions and eliminate the water which is present. The drying temperatures may vary from 100° C. up to about 300–400° C., the higher temperatures being necessary in drying compositions, the water content of which is directly combined with one or more of the components of the binder. A further limitation upon the drying process is that it must be conducted at a temperature below the temperature at which the heat resistant component of the composition would be destroyed. Thus, where asbestos fibers are employed as the heat resistant component, the drying step must be carried out at a temperature below about 500° C., the latter temperature being that at which the asbestos fiber structure is destroyed.

Owing to the relatively neutral characteristics of this group of compositions, it is possible to transform them into solids by means of chemical hardening without employing excessive amounts of basic materials. This setting process is carried out by adding to the solution a relatively small quantity of a suitable basic insolubilizing substance as for example an oxide, phosphate or silicate which is capable of reacting with the binder to form an oxy-salt. The basic insolubilizing substance employed need not necessarily be an aluminum salt for salts of calcium, magnesium, zinc and lead may be used to effect the same result. A composition comprising an aluminum phosphate dissolved in the presence of aluminum sulfate may be reacted with a calcium or barium silicate to form insoluble sulfates, phosphates, silicates or insoluble complex salts thereof. Thus the sulfate radical will be rendered insoluble and hence inactive and the composition effectively hardened. A further feature of the above use of basic insolubilizing compounds is that materials may be employed for this purpose which, upon reacting with the remaining components of the binder, form end products which in turn function as modifying ingredients for varying the friction characteristics of the friction composition. For example, the use of a basic barium or lead compound as an insolubilizing agent will result in the formation of barium or lead sulphates which are excellent modifying agents for controlling the frictional characteristics of the final product.

*Example 1*

The solubilizing characteristics of aluminum sulfate, chloride and nitrate are exemplified by the following procedure. One mol. or slightly less of aluminum chloride effectively dissolves one mol. of aluminum phosphate in an aqueous medium. The solution thus obtained may be heated and concentrated. Upon cooling, a viscous tacky clear solution is obtained which may be diluted with water in any proportion without spontaneous precipitation of solids. Either the undiluted or diluted solution may be mixed with a heat resistant material such as asbestos which may then be molded and solidified by drying as described above. Alternatively, an insolubilizing basic substance may be incorporated in the binder solution to effect solidification thereof. The solution, however, may be further dehydrated by heating to above 100° C. and if the heating is continued until the temperature of the solution increased to somewhat below 150° C. a stable glassy solid is obtained upon cooling which may be redissolved in water to form a viscous tacky binder for heat resistant materials which may be transformed into a solid bond in a similar manner. In incorporating the liquid binder compositions with the heat resistant component, care must be exercised to obtain a homogeneous distribution of the binding agent throughout the heat resistant component. This may be accomplished by spraying the liquid binders upon the heat resistant component. If the binding agents are not added to the fibrous material such as asbestos in a highly atomized or finely divided state but simply poured into the fiber, there is a tendency for the fibers to nodulize during tumbling which results in poor distribution of the binding agent in the mass and an undesirable product is obtained.

The binders of this group may be produced from mixtures of the respective acids as for example a mixture of phosphoric and hydrochloric acids may be employed in treating a base such as aluminum hydrate or bauxite.

TYPE II

The friction materials comprising this group are prepared with binding agents that are analogous to those of the preceding group in that they are relatively neutral and hence require the use of only small amounts of insolubilizing basic materials such as oxides, during chemical hardening or setting of the binder. These binding agents are prepared from trivalent metal salts of inorganic or organic acids such as aluminum or ferric sulfates, nitrates or chlorides and a divalent metal phosphate such as calcium phosphates and zinc phosphates. Care must be exercised to select trivalent metal salts and divalent metal phosphates which provide ions in a liquid phase that have the ability to form complex colloidal compounds that remain as such and do not crystallize. The binders comprising this group may be prepared either by dissolving the various ingredients in an aqueous medium which may then be mixed with the heat resistant material as described in the previous group or, under certain conditions, by homogeneously mixing the dry ingredients in a finely divided state with the heat resistant materials. These binders possess all of the beneficial characteristics of those in the preceding group as well as the additional advantage that better control may be exercised during their preparation; as for example, their acidity may be controlled very simply according to this method by using the mono, di or tribasic phosphates of divalent metals such, for example as calcium, barium and zinc.

*Example 2*

One mol. of aluminum sulfate and two mols. of di-basic calcium phosphate were dissolved in an aqueous medium and heated. A viscous tacky liquid was obtained which contained a very finely divided white precipitate consisting mostly of sulphate, but which may also contain complex salts formed by the sulphate and phosphate radicals. This precipitate may be left in the binder or removed from the solution of compounds formed from alum and the phosphate and sulphate radicals such as aluminum phosphate, or sulphate or complex phosphate and sulphate salts of alum, by known methods such as decantation. The clear liquid thus obtained may be concentrated by heating without precipitation of solids owing to the presence of the sulfate ion. Upon evaporation at water bath temperatures, a glassy solid is obtained which may be redissolved without substantial hydrolysis to form a viscous tacky solution which may then be mixed by spraying or other appropriate means with asbestos or other heat resistant materials. The resultant mixture is then formed by molding itno the desired shape and the binder transformed into a solid as described in the preceding group.

The formation of the white precipitate in the above reaction may favor the production of the tacky condition. It appears, however, that the reaction of zinc phosphate and aluminum sulfate also produces tacky binders. It is, therefore, not generally true that the divalent metal ion and the sulfate ion have to be eliminated from the solution to obtain this property. It is more important that these ions in the liquid binder be capable of forming complex, colloidal type solutions which exhibit an ability to remain in this condition without crystallizing. In contrast to the binder prepared from zinc phosphate and aluminum sulfate, the reaction products of magnesium phosphate and aluminum sulfate tend to crystallize.

In preparing the binding agent solution per se in the foregoing example, the aluminum sulfate and di-basic calcium phosphate were first mixed together in a dry state and then dissolved in about one liter of water. The solution thus obtained, while viscous and tacky was found to contain small lumps as well as to be granular. In order to overcome this objection the several ingredients were dissolved separately in water and the solutions obtained were then mixed together. The di-basic calcium phosphate formed a slurry in water and was added to the aluminum sulfate solution while stirring rapidly. This procedure elimilated the lumpy condition but required large amounts of water; as for example, four to five liters as compared to approximately one liter which was used when the mixture of dry ingredients was dissolved in water. Accordingly, the method of employing hot solutions of the several ingredients was investigated. A hot aqueous slurry of di-basic calcium phosphate was added to a hot solution of aluminum sulfate with agitation. A viscous tacky solution free from lumps was obtained and the amount of water employed varied from only one-half to one liter. Various proportions of the aluminum sulfate and di-basic calcium phosphate were employed in the foregoing methods, the proportions however, always being in the ratio of gram molecular weights or fractions of molecular weights of the components. The results obtained in each instance were similar.

*Example 3*

In preparing these compositions from crude commercial materials the following composition is typical. A mixture of the following ingredients was prepared,

| | |
|---|---|
| Pebble rock containing 25% $Ca_3(PO_4)_2$ grams | 1240 |
| Sulphuric acid 93% pure containing 25% water do | 453 |
| Bauxite containing 50% $Al_2O_3$ do | 204 |
| Water cc | 200 |

After materials had reacted, the mixture was allowed to stand and the insoluble material which settled out was removed and discarded. About four hundred twenty-six grams of tacky material were recovered which analyzed as follows,

| | |
|---|---|
| CaO | 1.00 |
| MgO | 0.5 |
| $Al_2O_3$ | 18.00 |
| $Fe_2O_3$ | 3.00 |
| $PO_4$ | 48.00 |
| $SO_4$ | 30.00 |
| $NO_3$ | 00.03 |
| $TiO_2$ | 00.10 |
| $V_2O_5$ | 00.05 |
| $SiO_2$ | 00.10 |
| MnO | 00.05 |

Allowing for water and impurities, it is calculated that the percentage recovery of the main ingredients is as follows,

| | Per cent recovery |
|---|---|
| Iron and aluminum | 50 |
| Sulphate | 18 |
| Phosphate | 60 |

These recoveries may be readily further improved. The low sulphate recovery is due to the fact that the greater proportion of acid reacts with the lime to form insoluble sulphates which are removed with other insoluble matter.

A further and very satisfactory method of preparing the compositions of this group was carried out by mixing the aluminum sulfate and mono or di-basic calcium phosphates in a dry state in a ball mill. The finely divided homogeneous dry mixture was then exposed to live steam for a few minutes. The moisture and heat of the steam promoted the reaction and brought about a tacky, sticky condition in the mass. The mass is then cooled and solidified and may be shipped in a highly concentrated form. A viscous tacky binder solution may be formed from this product merely by dissolving it in water which may be homogeneously mixed with asbestos or similar materials as previously described. The mixture may be formed in any desired shape and the viscous, tacky solution transformed into a solid state as already described. The binder is neutral enough to prevent the destruction of crysotile fibers by acid decomposition and by a simple drying operation a well bonded, water-resistant product may be obtained from this asbestos. As a variation the binder may be produced in place by homogeneously mixing the ingredients in a finely divided dry state with the material to be bonded as, for example in a ball mill, and subsequently steaming or otherwise heating the entire composition under pressure.

For example, different liquid binders prepared from different molecular ratios of aluminum sulfate and calcium acid phosphates, such as the mono or di-basic calcium phosphates or the calcium meta-phosphates were sprayed on asbestos and the asbestos was then molded into briquettes under a pressure of ten thousand pounds per square inch and heated in an oven to 250° C. A firm well bonded product was obtained. In some cases a water proofing agent such as red lead was mixed and ball milled with the dry asbestos. A typical composition employed in bonding asbestos in the foregoing manner appears as follows:

| | |
|---|---|
| $Al_2(SO_4)_3 \cdot 14\frac{1}{2}H_2O$ | grams 603 |
| $CaHPO_4$ | do 272 |
| Water | cc 500 |

A further modification of the formation of the binders in this group may be accomplished by introducing either the phosphates or the other acid radical in the form of an ammonium salt. The composition may then be heated to above the volatilization temperature of the ammonium compound to decompose the salt, leaving as the residue the stable components of the bond. Owing to the high volatility of the ammonium compounds as a group, decomposition may be effected at temperatures below those at which the fiber structure of the heat resistant component would be harmed.

TYPE III

The friction compositions falling within this group, while closely related to those of the preceding group, depend upon an even broader concept. It has been determined that certain metallic salts of inorganic acids exist as hydrates in which the degree of hydration is sufficient to dissolve and liquefy the salt under certain conditions of temperature and pressure. The metallic salts thus dissolved in their own water of crystallization will react with the phosphatic material to form the binders herein disclosed. The temperatures and pressures at which the hydrated metallic salts dissolve vary with the degree of hydration. For example, aluminum sulfate containing 18 mols. of water will melt in its own water of crystallization at 85° C. and in this form will react with calcium phosphate to produce an excellent binder. By adding such basic materials as barium carbonate or lead oxide which act as insolubilizers in that they react to form water insoluble sulfates, it is possible to obtain fully insoluble reaction products as well as assist in the process of hardening, or setting of the phosphate by the formation of oxy-phosphate. This was verified by experimental work in bonding either long or short fiber asbestos with a mixture of a hydrated aluminum sulfate, a calcium phosphate, such as mono or dicalcium phosphate or calcium meta phosphate and an insolubilizer for the sulfate radical such as barium carbonate or lead oxide. Upon applying heat and pressure, the hydrated salt liquefied and the reaction took place forming a non-porous strong bond. The basic insolubilizing agents form, as mentioned above, modifying substances capable of varying the friction characteristics of the final product. In the presence of readily decomposed silicates or hydrated silica a certain amount of silico-phosphate may form. For example, such reactions may take place when magnesium silicate (serpentine) readily reacting aluminum silicates such as clays, hydrated silica (opal) or diatomaceous earth are present.

The basic or acidic phosphates, meta phosphates of pyrophosphates may be used and their degree of acidity may be modified by the addition of sulphuric, phosphoric, or other suitable acids before reaction with aluminum, iron or other metallic sulphate.

It has been ascertained that in place of hydrated aluminum sulfate, hydrated salts in general may be employed which are capable of dissolving in their own water of crystallization and in solution will react with other compounds to form a temporarily plastic or fluid substance which further reacts and solidifies to form water resistant and insoluble materials. For example, various other salts may be employed such as ferric sulfate, aluminum chloride, ferric chloride, magnesium sulfate, magnesium chloride and zinc sulfate. These salts may be compounded with phosphates or other substances such as zinc oxide or magnesia which will react to form insoluble sulfates or chlorides such as oxy-sulfates or oxy-chlorides. There is no particular limitation on the temperature at which the foregoing reactions are carried out other than that of the temperature at which the heat resistant component is harmed since the phosphates are stable at quite high temperatures. This high degree of heat stability is of importance, if the finished product is to be used in heavy duty brakes such as those found on large airplanes, trucks, oil and well drilling equipment. It enables the inorganic binder to replace synthetic resin or oxidizable and polymerizable oil binders and may also be used in other developments to which these organic binders are unsuited owing to their lack of heat stability. Ordinarily the reaction is conducted under pressures of about 10,000 pounds per square inch and at temperatures ranging from the liquefying point of aluminum sulfate (85° C.) to about 250° C. If conditions require it, the liquefying temperature may be reduced by the introduction of steam or a minor proportion of water.

*Example 4*

A test of the binder in bonding asbestos was carried out as follows. The following mixture was ball milled in a dry state until a homogeneous mass was obtained.

| | Per cent by weight |
|---|---|
| Asbestos | 30 |
| Aluminum sulfate and calcium phosphate | 50 |
| Barium carbonate | 20 |

The finely divided dry mixture of sulfate and phosphate was prepared in molar ratio or 603 grams of sulfate containing 14.5 mols. of water and 272 grams of phosphate. To this mixture may be added barium carbonate, lead oxide or other modifying ingredients such as finely ground phosphate rock, copper ferrite, magnesium oxide, fly ash, ferric oxide, zinc oxide, Portland cement, talc, clay and aluminum oxide. The homogeneous mixture is thereupon heated and subjected to pressure to liquefy the hydrated salt and carry out the reaction whereby a water insoluble binder is formed.

Another binder composition which has been found to be very satisfactory was prepared by mixing equimolecular quantities of aluminum sulphate and the mono calcium phosphate as follows,

| | Parts by weight |
|---|---|
| $Al_2(SO_4)_3.18H_2O$ | 666 |
| $Ca(H_2PO_4)_2.H_2O$ | 252 |

The above binding agent may be incorporated with heat resistant materials in the following proportions and molded with heat and pressure to provide a well bonded, water resistant and perfectly dense friction material.

| | Parts by weight |
|---|---|
| Asbestos | 15 |
| Binder | 15 |

| | Parts by weight |
|---|---|
| Asbestos | 15 |
| Binder | 15 |
| Graphite | 4 |

The proportions of the above components however may vary considerably but they remain roughly within the range of from 30–80% asbestos, 20–50% sulphate-phosphate mixture and 10–30% insolubilizing basic material. In the above binders the mono and di-calcium phosphates may be replaced by the superphosphates as, for example triple superphosphate or meta phosphates.

The advantages of these thermosetting binders are obvious in that they permit the use of previously employed methods of bonding with thermosetting plastics. Moreover, by dispensing with the use of large amounts of liquid required when binders such as silicate of soda are employed, the step of drying is eliminated. As the vaporization of water during drying will cause the formation of a porous type of bonded structure the elimination of excessive quantities of water insures a non-porous type of bonded structure and a dense insoluble product. The absence of moisture is also important when heat resistant components, which retard the escape of moisture, such as mica in flake form, are employed.

Whereas friction materials bonded with resins or oils as mentioned above fail due to charring and destructive decomposition of these binders when they are subjected to the degree of heat encountered in heavy duty work, the binders of this invention are merely dehydrated by this heating. The dehydration of these binders instead of causing the bond and the friction composition as a whole to fail, produces an increase in the hardness of the bond and hence of the strength of the friction composition.

The friction materials disclosed herein may also be prepared by substituting arsenates for the various phosphates employed.

The raw material sources for the commercial preparation of the foregoing type of binders comprise the large phosphate rock, sulphur and bauxite deposits in this country. Thus the most direct and simple approach to the preparation of the compositions herein comprising the treatment of phosphate rock concentrate and bauxite with sulphuric acid is assured. The utilization of aluminum and iron phosphate and arsenate minerals as raw materials such as lazulite, wavellite, variscite, scorodite, dufrenite and strengite may be of interest though these minerals are not available at present in commercial quantities. Hembrock clay, which is the residue from the production of Florida phosphate rock, contains some wavellite. However, this is so finely divided and so intimately mixed with the clay that it is difficult to separate it by flotation or other commercial separating methods. Leaching with acid or sulphate, chloride or nitrate solutions followed by sedimentation and washing of the solid residue may prove to be a feasible method for extracting the aluminum phosphate values in this residue. A cheap source of iron sulfate is the waste pickling liquor.

The compositions herein considered have been directed to the trivalent metal phosphates and the di and mono-valent metal phosphates have not been discussed. These latter phosphatic materials form tacky solutions in certain instances such as zinc phosphate in phosphoric acid. The efficacy of these materials is less definite and their principal application resides merely in their use as modifying agents for the trivalent metal phosphate solutions.

The friction compositions of this invention may in each instance contain modifying ingredients which vary the frictional characteristics of the final product. As has been brought out above, these modifying ingredients may be formed in situ by selecting insolubilizing compounds which react with other components of the binder mixture to form compounds capable of varying the frictional characteristics of the finished product. Lead oxide, barium oxide and barium carbonate are examples of materials of this type which react in the binder mixture to form sulphates that act as friction characteristic modifiers. Other modifying ingredients may be incorporated in the compositions for the same purpose as, for example, graphite and soft metal flakes or chips such as brass, zinc, aluminum, copper or Babbit metals. Any of the well known materials commonly added to friction compositions for this purpose may also be employed. These modifying ingredients are usually incorporated with the heat resistant components and the mixture ball milled to obtain homogeneous distribution thereof throughout the mass. If the binding agents are employed in a finely divided dry state, they may be homogeneously distributed therewith in the same operation or by subsequent mixing operations. When liquid binders are employed the homogeneous mixture of heat resistant and modifying materials may be sprayed with the binders to produce a uniform mixture of these various components. The homogeneity of the mixture is, as has been pointed out, necessary to obtain a satisfactory product and the methods described above or equivalent methods must be carried out to insure uniformity of the composition and to prevent nodulizing.

We claim:

1. An artificially integrated and shaped friction material comprised of an insoluble and nonporous substance comprising by weight asbestos from about 30–80 percent and the reaction product of from about 20–50 percent of a mixture of aluminum sulphate and a calcium phosphate in molecular proportions and of from about 10–30 percent barium carbonate.

2. A process of making an artificially integrated and shaped friction material comprising homogeneously mixing in a dry state a heat resistant component, a hydrate of aluminum sulphate, di-calcium phosphate and barium carbonate, molding the mixture under heat and pressure to free the water of crystallization and to react said hydrate of aluminum sulphate, di-calcium phosphate and barium carbonate and thereafter cooling the molded product to transform the reaction product into a dense water-resistant solid.

HERBERT H. GREGER.
SOUTHWICK W. BRIGGS.

REFERENCES CITED

The following references are of record in the file of this patent:

UNITED STATES PATENTS

| Number | Name | Date |
|---|---|---|
| 1,932,912 | Rosner | Oct. 31, 1933 |
| 2,001,194 | Hodnefield | May 14, 1935 |
| 1,962,577 | Wolochow | June 12, 1934 |
| 2,161,290 | Grimm | June 6, 1939 |
| 1,828,211 | Wolfsholz | Oct. 20, 1931 |
| 2,218,058 | Stalhane | Oct. 15, 1940 |
| 2,351,641 | Sohl | June 20, 1944 |

FOREIGN PATENTS

| Number | Country | Date |
|---|---|---|
| 145,052 | Great Britain | 1921 |
| 233,907 | Great Britain | 1925 |
| 4,954 | Great Britain | 1883 |